(12) United States Patent
Kim (10) Patent No.: US 9,083,039 B2
(45) Date of Patent: Jul. 14, 2015

(54) RECHARGEABLE BATTERY

(71) Applicants:SAMSUNG SDI CO., LTD., Yongin-si, Gyeonggi-do (KR); ROBERT BOSCH GMBH, Stuttgart (DE)

(72) Inventor: Duk-Jung Kim, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 211 days.

(21) Appl. No.: 13/739,743

(22) Filed: Jan. 11, 2013

(65) Prior Publication Data

US 2013/0260215 A1    Oct. 3, 2013

Related U.S. Application Data

(60) Provisional application No. 61/616,644, filed on Mar. 28, 2012.

(51) Int. Cl.
*H01M 2/18* (2006.01)
*H01M 2/26* (2006.01)
(Continued)

(52) U.S. Cl.
CPC ........ *H01M 2/26* (2013.01); *H01M 2/02* (2013.01); *H01M 2/021* (2013.01);
(Continued)

(58) Field of Classification Search
CPC ......... H01M 2/00; H01M 4/00; H01M 10/00; H01M 2/02; H01M 2/0202; H01M 2/021; H01M 2/1061; H01M 2/0217; H01M 2/1072; H01M 2/18; H01M 2/26; H01M 2/263; H01M 2/266
USPC ......... 429/130, 138, 151, 154, 186, 208, 237, 429/246
See application file for complete search history.

(56) References Cited

U.S. PATENT DOCUMENTS

2006/0051664 A1    3/2006   Tasai et al.
2006/0115722 A1    6/2006   Kim
(Continued)

FOREIGN PATENT DOCUMENTS

| EP | 2346110 A1 | 7/2011 |
| JP | 2009-301892 A | 12/2009 |
| JP | 2010-282847 A | 12/2010 |

OTHER PUBLICATIONS

European Search Report dated Apr. 5, 2013.

*Primary Examiner* — Patrick Ryan
*Assistant Examiner* — Ben Lewis
(74) *Attorney, Agent, or Firm* — Lee & Morse, P.C.

(57) ABSTRACT

A battery may include an electrode assembly including a first electrode and a second electrode, an electrode terminal, a current collecting member electrically connecting the electrode terminal and a first electrode uncoated region of the first electrode, a fixing member, and a case. The current collecting member may include a terminal connecting portion coupled to the electrode terminal and an electrode connecting portion extending from the terminal connecting portion. The electrode connecting portion may include an extending connecting plate and a current collecting piece extending from the connecting plate and being in contact with the first electrode uncoated region along sidewalls of the first electrode uncoated region. The fixing member may include a current collecting member coupling portion engaged with the current collecting member, the electrode connecting portion extending through the fixing member. The fixing member may be between the current collecting member and the case.

20 Claims, 10 Drawing Sheets

(51) Int. Cl.
*H01M 2/02* (2006.01)
*H01M 2/10* (2006.01)
*H01M 10/04* (2006.01)
*H01M 10/0587* (2010.01)

(52) U.S. Cl.
CPC ......... *H01M 2/0202* (2013.01); *H01M 2/1061* (2013.01); *H01M 2/1072* (2013.01); *H01M 2/18* (2013.01); *H01M 2/263* (2013.01); *H01M 2/266* (2013.01); *H01M 10/0431* (2013.01); *H01M 10/0587* (2013.01); *H01M 2/0217* (2013.01); *H01M 2220/20* (2013.01); *H01M 2220/30* (2013.01)

(56) References Cited

U.S. PATENT DOCUMENTS

| 2007/0196729 | A1* | 8/2007 | Yamauchi et al. ............ 429/130 |
| 2011/0086265 | A1  | 4/2011 | Suzuki |
| 2011/0183165 | A1  | 7/2011 | Byun et al. |
| 2012/0135283 | A1* | 5/2012 | Lee ................................ 429/82 |

* cited by examiner

RECHARGEABLE BATTERY

CROSS-REFERENCE TO RELATED APPLICATION

The present application claims priority under 35, U.S.C. §119(e) to U.S. Provisional Application No. 61/616,644, filed on Mar. 28, 2012, and entitled: "Rechargeable Battery," which is incorporated herein by reference in its entirety.

BACKGROUND

1. Field

The described technology relates generally to a rechargeable battery, and more particularly, to a rechargeable battery including a fixing structure of an electrode assembly.

2. Description of the Related Art

Unlike a primary battery that is incapable of being recharged, a rechargeable battery can be repeatedly charged and discharged. Low capacity rechargeable batteries are used in small, portable electronic devices, e.g., mobile phones, laptop computers, and camcorders, and large capacity rechargeable batteries are widely used as power sources for driving motors, e.g., of hybrid vehicles and the like.

Recently, high power rechargeable batteries using non-aqueous electrolyte with high energy density have been developed. In order for such high power rechargeable batteries to be used for driving motors of machines requiring high power, such as electric vehicles, a plurality of rechargeable batteries is coupled in series to form a large capacity battery module.

A battery module is generally formed of a plurality of rechargeable batteries which are coupled in series, and a rechargeable battery may be formed in a cylindrical, angular, or other shape. Accordingly, various structures are being proposed for housing a plurality of rechargeable batteries securely in a case, and some of these structures are being used for battery modules.

The above information disclosed in this Background section is only for enhancement of understanding of the background of the described technology and therefore it may contain information that does not form the prior art that is already known in this country to a person of ordinary skill in the art.

SUMMARY

Embodiments are directed to a battery including an electrode assembly having a first electrode and a second electrode, an electrode terminal, a current collecting member electrically connecting the electrode terminal and a first electrode uncoated region of the first electrode, a fixing member, and a case, the electrode assembly, the current collecting member, and the fixing member being disposed within the case. The current collecting member may include a terminal connecting portion coupled to the electrode terminal, and an electrode connecting portion extending from the terminal connecting portion. The electrode connecting portion may include an extending connecting plate and a current collecting piece extending from the extending connecting plate along the first electrode uncoated region, the current collecting piece being in contact with the first electrode uncoated region along sidewalls of the first electrode uncoated region. The fixing member may include a current collecting member coupling portion engaged with the current collecting member, the electrode connecting portion extending through the fixing member. The fixing member may be between the current collecting member and the case.

The fixing member may include a separating portion extending from the current collecting member coupling portion along the current collecting member and between the current collecting member and an inner wall of the case.

The separating portion may only partially extend along the current collecting member.

The separating portion may cover both the electrode uncoated region and the current collecting piece.

The current collecting member coupling portion may include an insert slot through which the electrode connecting portion extends.

The fixing member may include a recess receiving the terminal connecting portion.

The fixing member may include fixing protrusions adjacent the recess, the fixing protrusions extending beyond the terminal connecting portion.

The fixing member may be made of an insulating material.

The current collecting member coupling portion may extend along the electrode assembly to be between the electrode assembly and an adjacent component.

The first electrode uncoated region may include a plurality of first electrode uncoated regions The connecting plate may extend from and at an angle to the terminal connecting portion.

The current collecting piece may include a plurality of current collecting pieces extending from the connecting plate, the plurality of current collecting pieces being spaced from one another and in contact with respective first electrode uncoated regions.

The connecting plate may be bent at approximately a right angle to the terminal connecting portion so that the connecting plate is between the first electrode uncoated regions and a side wall of the case.

The plurality of current collecting pieces may be welded to respective first electrode uncoated regions.

The fixing member may include a supporting portion extending from the current collecting member coupling portion along the current collecting member and between the current collecting member and first electrode coating region of the electrode assembly.

The supporting portion may include a first mating feature and the current collecting member may include a second mating feature, the second mating feature corresponding to and complementary to the first mating feature.

The fixing member may include a fixing rib portion that extends from the supporting portion towards an inner wall of the case beyond the current collecting member and the first uncoated electrode region.

The fixing rib portion may include a fixing rib between the inner wall of the case and the current collecting member.

The electrode assembly may include a plurality of electrode assemblies and the current collecting member wherein the collecting piece includes a pair of current collecting pieces that are spaced apart, the fixing rib portion extending between the pair of current collecting pieces.

The fixing rib portion may include fixing slots extending from the fixing rib along an outer surface of each current collecting piece of the pair of current collecting pieces.

The fixing rib may extend laterally to be between both current collecting pieces and the inner wall of the case.

The fixing member may include a separating portion extending from the current collecting member coupling portion along the current collecting member and between the current collecting member and an inner wall of the case.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawings, the thickness of layers, films, panels, regions, etc., are exaggerated for clarity. It will be understood that one layer or element that is said to be "on" another layer or base may be directly on the other layer or base, or may have another layer interposed therebetween. It will also be understood that one layer that is said to be "under" another layer may be directly under the other layer or have at least one other layer interposed therebetween. Further, it will be understood that one layer that is said to be "between" two other layers may be the only layer between the two layers or may have at least one or another layer inserted therebetween. In addition, like reference numerals designate like elements in the present specification and drawings.

Figure 1:
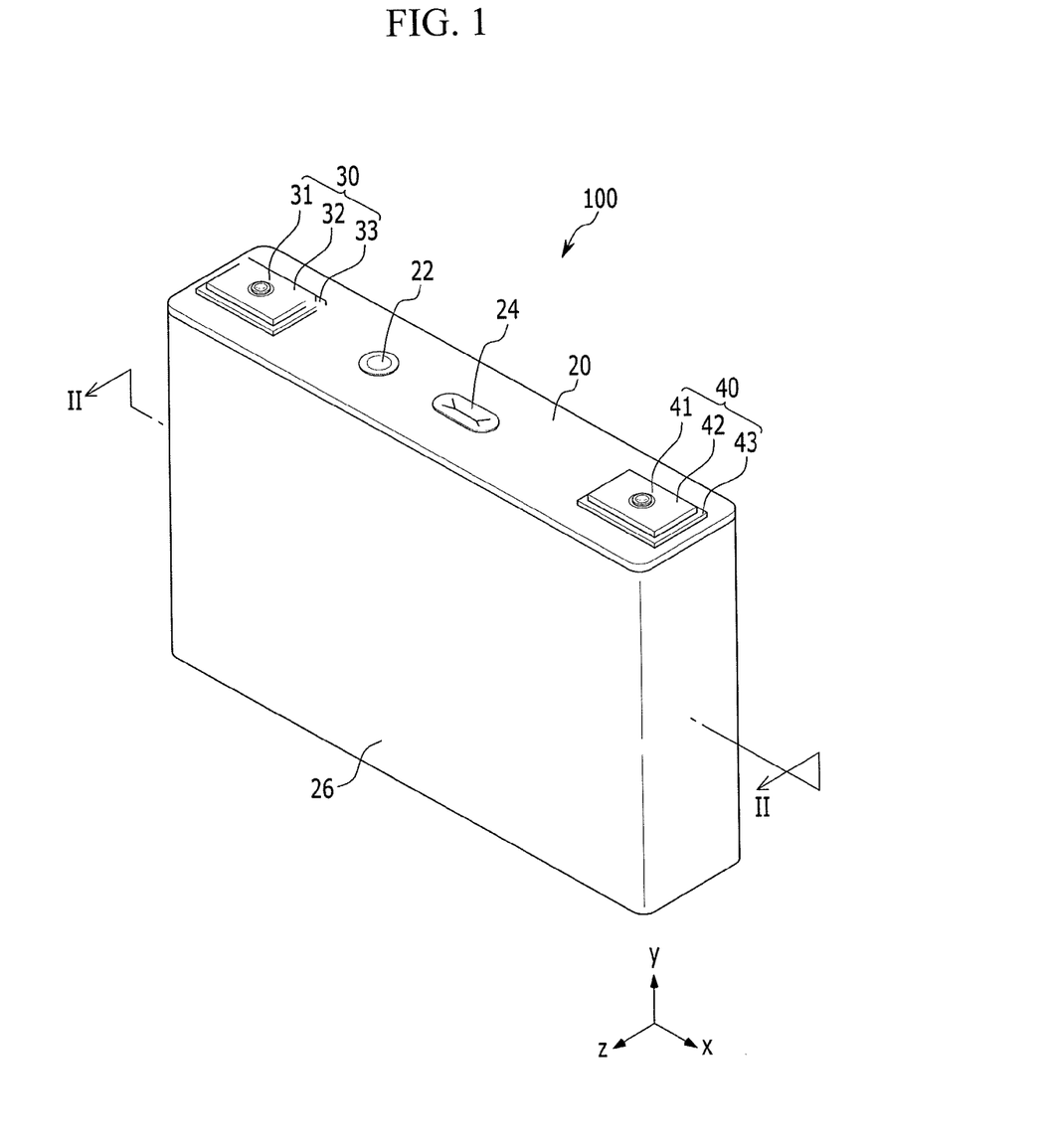
FIG. 1 illustrates a perspective view of a rechargeable battery according to an exemplary embodiment.
Figure 2:
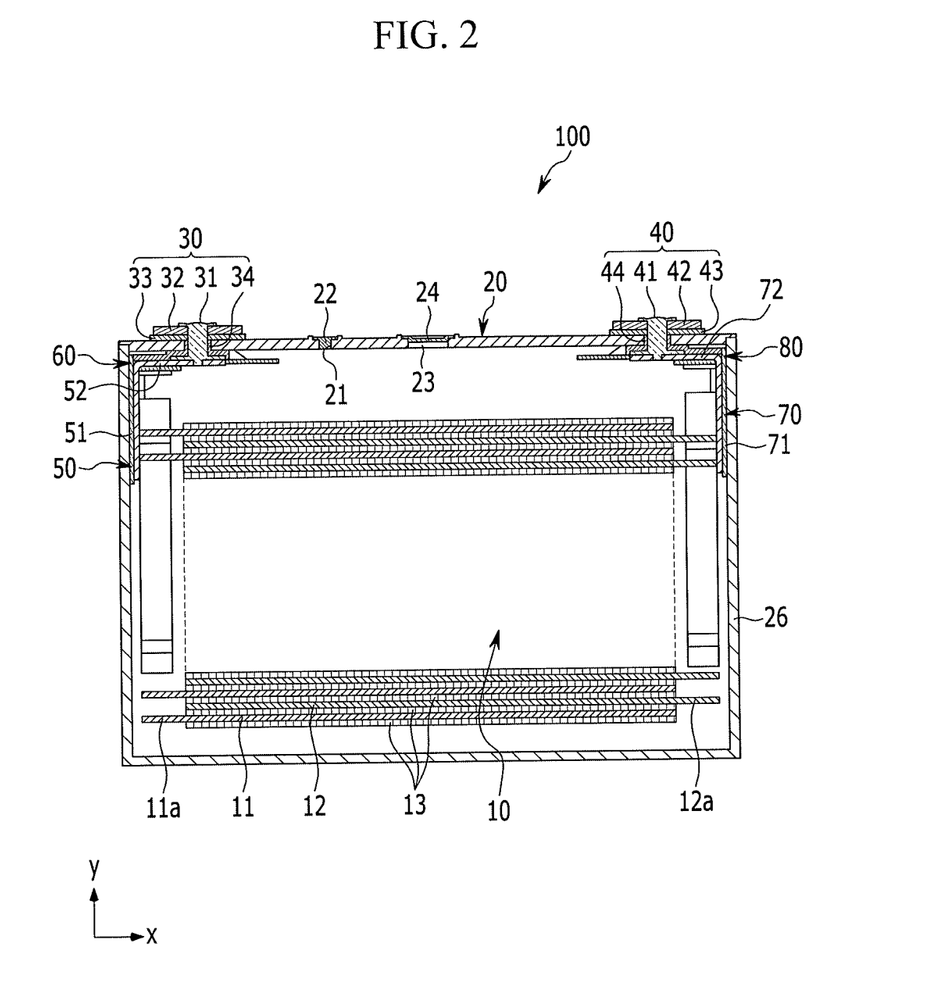
FIG. 2 illustrates a cross-sectional view taken along line II-II in FIG. 1.

FIG. 1 illustrates a perspective view of a rechargeable battery according to an exemplary embodiment. FIG. 2 illustrates a cross-sectional view taken along line II-II in FIG. 1.

Referring to FIGS. 1 and 2, a rechargeable battery 100 according to the present exemplary embodiment includes a plurality of electrode assemblies 10 formed wound with a separator 13 interposed between a first electrode 11 and a second electrode 12, a case 26 housing the electrode assembly 10, a first terminal portion 30 and a second terminal portion 40 electrically connected to the electrode assembly 10, a cap plate 20 coupled on an opening formed in the case 26, and first and second fixing members 60 and 80 installed in the case 26.

The rechargeable battery 100 according to the present exemplary embodiment is exemplarily described as an angular lithium ion secondary battery. However, embodiments may also be applied to other types of batteries, e.g., lithium polymer batteries.

Further, while the first electrode 11 may be configured as a negative electrode and the second electrode 12 may be configured as a positive electrode, conversely, the first electrode 11 may be configured as a positive electrode, and the second electrode 12 may be configured as a negative electrode. However, for better comprehension and ease of description, the first electrode 11 and the second electrode 12 will be described as a negative electrode and a positive electrode, respectively.

The electrode assembly 10 may be formed in a jelly roll configuration, with the first electrode 11, the second electrode 12, and the separator 13 being wound together. Here, the first electrode 11 and the second electrode 12 each include a current collector formed as a thin plate of metal foil and an active material coated on the surface of each current collector.

The first electrode 11 and the second electrode 12 may be separated into a coating region, in which an active material is coated on the current collector, and a first uncoated region 11a, and a second uncoated region 12a, in which the active material is not coated on the current collector. The coating region forms most of the first electrode 11 and the second electrode 12 portion in the electrode assembly 10, and the first and second uncoated regions 11a, and 12a, are disposed in a jelly roll form at both sides of the coating region, respectively.

Alternatively, the electrode assembly 10 may have a structure in which the first electrode 11 and the second electrode 12 formed as a plurality of sheets are stacked with the separator 13 therebetween.

In the electrode assembly 10, the first terminal portion 30 is electrically connected to the first uncoated region 11a, with a first current collecting member 50 therebetween, and the second terminal portion 40 is electrically connected to the second uncoated region 12a, with a second current collecting member 70 therebetween. The first terminal portion 30 may include a first terminal 31, the second terminal portion 40 may include a second terminal 41, and the first terminal 31 and the second terminal 41 may be integrally combined with the first and second current collecting members 50 and 70, respectively.

The case 26 may have a hexahedral shape including an opening in one side thereof. Alternatively, the case 26 may be formed in various other shapes, e.g., a cylindrical or pouch shape.

The cap plate 20 may be formed of a thin plate material and may be coupled on the opening of the case 26 to close and seal the opening. Further, an electrolyte injection opening 21 for injecting an electrolyte solution into the closed and sealed case 26 may be formed in the cap plate 20. The electrolyte injection opening 21 is sealed by a sealing cap 22 after the electrolyte solution is injected. In addition, a vent hole 23 housing a vent plate 24, which is broken when the internal pressure of the closed and sealed case 26 exceeds a predetermined pressure, may be formed in the cap plate 20.

The first and second terminal portions 30 and 40 may include first and second terminals 31 and 41, first and second terminal plates 32 and 42, a first terminal insulating member 33 between the first plate 32 and the cap plate 20, a second insulating member 43 between the second terminal plate 42 and the cap plate 20, a conductive connecting member 43, and first and second gaskets 34 and 44.

According to the present exemplary embodiment, the cap plate 20 may be electrically connected to the second terminal portion 40 by means of the conductive connecting member 43, and may thus have the polarity of a negative electrode or a positive electrode.

The first and second current collecting members 50 and 70 may include first and second electrode coupling portions 51 and 71 coupled to the first and second electrodes 11 and 12, and first and second terminal coupling portions 52 and 72 coupled to the first and second terminal portions 30 and 40. Here, each structure of the first and second terminal portions 30 and 40, each structure of the first and second current collecting members 50 and 70, and each structure of the first and second fixing members 60 and 80 according to the present exemplary embodiment are approximately the same, and thus, detailed descriptions of the second terminal portion 40, the second current collecting member 70, and the second fixing member 80 will not be provided.

Alternatively, the first terminal 31 and the second terminal 41 according to the present exemplary embodiment may include a terminal (not shown) that is not a plate type terminal, but is formed in a circular cylindrical shape. Further, instead of the conductive connecting member 43, an insulative insulating member may be installed between the cap plate 20 and the second terminal 41. Accordingly, the cap plate 20 may not be electrically connected to the second terminal portion 40.

Figure 3:
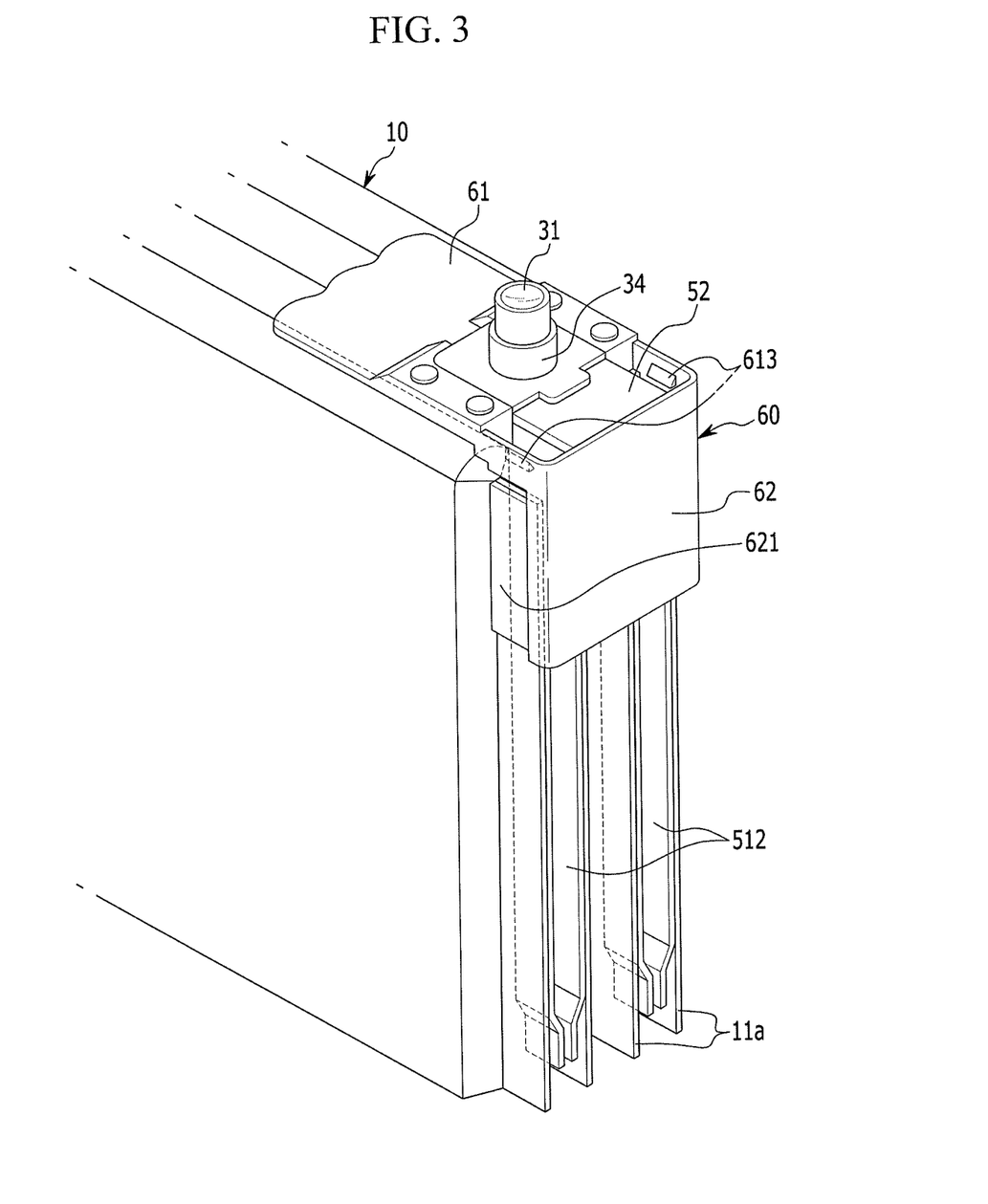
FIG. 3 illustrates a perspective schematic view of a coupled state of a current collecting member and a fixing member according to an exemplary embodiment with the electrode assembly.
Figure 4:
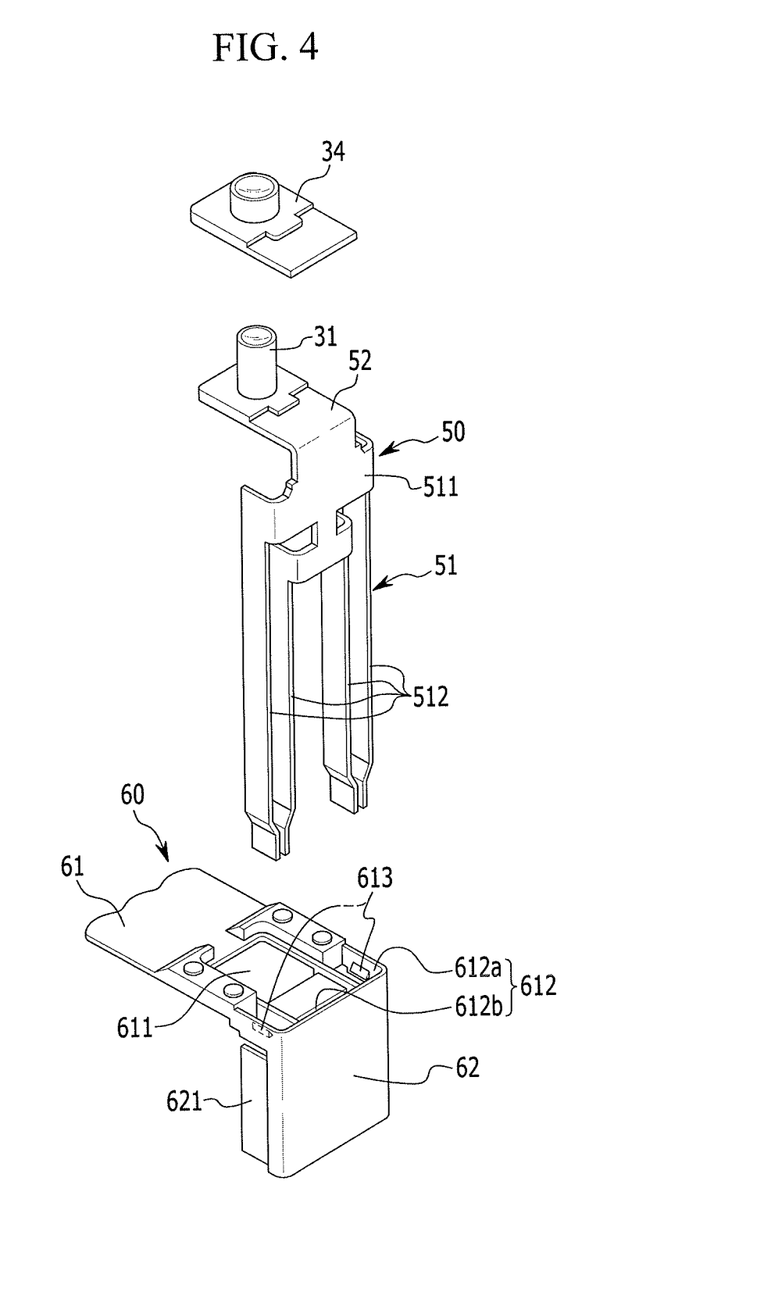
FIG. 4 illustrates an exploded perspective view of the dismantled state of a current collecting member and a fixing member of the rechargeable battery in FIG. 3.
Figure 5:
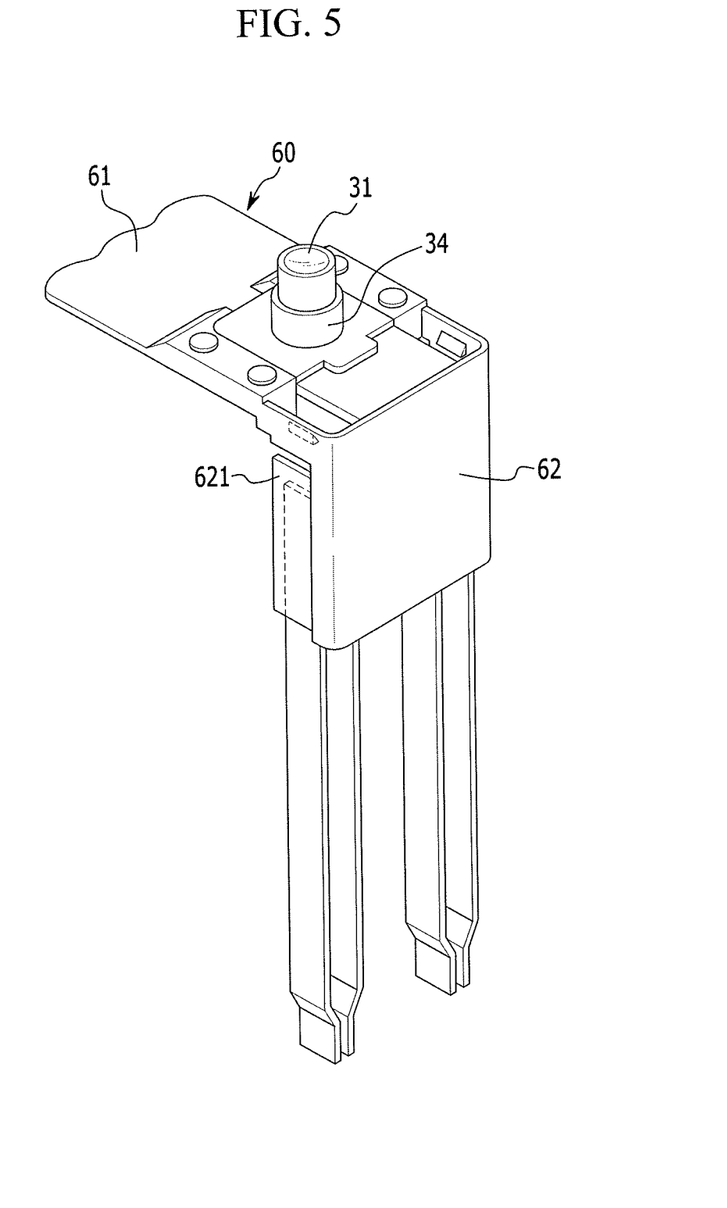
FIG. 5 illustrates a perspective view of a coupled state of the current collecting member and the fixing member of the rechargeable battery in FIG. 4.

FIG. 3 illustrates a perspective schematic view of a coupled state of a current collecting member and a fixing member according to an exemplary embodiment coupled with the electrode assembly. FIG. 4 is an exploded perspective view illustrating the dismantled state of a current collecting member and a fixing member of the rechargeable battery of FIG. 3. FIG. 5 illustrates a perspective view of a coupled state of the current collecting member and the fixing member of the rechargeable battery in FIG. 4.

Referring to FIGS. 3 to 5, the current collecting member 50 may include a terminal connecting portion 52 coupled to the first terminal 31 and an electrode connecting portion 51 extending from the terminal connecting portion 52.

The electrode connecting portion 51 according to the present exemplary embodiment may include a connecting plate 511 bent and extending from an end of the terminal connecting portion 52, and a plurality of current collecting pieces 512 formed extending from the end of the connecting plate 511 and having certain gaps therebetween.

The terminal connecting portion 52 may be combined in a thin rectangular plate shape with the first terminal 31 by welding. The width at a portion of the terminal connecting portion 52 facing the electrode assembly 10 may be approximately the same as the width of the cap plate 20.

Alternatively, the first terminal 31 may extend from the terminal connecting portion 52 or the first terminal 31 may be coupled to the terminal connecting portion 52 by being press fitted in a hole (not shown) that may be formed in the terminal connecting portion 52.

The connecting plate 511 may be bent at approximately a right angle and extends from an end of one side of the terminal connecting portion 52 and along the electrode assembly 10, so that the connecting plate 511 is disposed between the side of the electrode assembly 10 at which the uncoated regions 11a, and 12a, are disposed, and a sidewall of the case 26.

In addition, a plurality of current collecting pieces 512 may be extend from an end of the connecting plate 511 and spaced a certain distance apart from one another. In more detail, the current collecting pieces 512 according to the present exemplary embodiment may be combined in an elongated rectangular plate shape to the first uncoated region 11a, by welding and electrically connected to the electrode assembly 10.

The fixing member 60 according to the exemplary embodiment may include a current collecting member coupling portion 61 and a separating portion 62.

The current collecting member coupling portion 61 according to the present exemplary embodiment may include a first slot 611, a second slot 612, and a fixing protrusion 613. The second slot 612 may include a plurality of current collecting piece insert slots 612a, and connecting plate insert slots 612b.

The separating portion 62 according to the present exemplary embodiment may be in the shape of a wide plate having a predetermined thickness and formed bent and extending from an end at one side of the current collecting member coupling portion 61. Specifically, the separating portion 62 may be bent and extend from a portion adjacent to a portion at which the second slot 612 is formed, and may be disposed between the electrode connecting portion 51 of the current collecting member 50 and the case 26. An enclosing portion 621 may extend from the separating portion 62 towards the electrode assembly 10 to enclose an upper portion of the electrode connecting portion 51.

Hereinafter, the coupled relationship between the current collecting member 50 and the fixing member 60 will be described in detail with reference to FIGS. 3 to 5.

According to the present exemplary embodiment, the electrode connecting portion 51 of the current collecting member 50 may be inserted in the second slot 612 formed in the current collecting member coupling portion 61 of the fixing member 60, and the terminal connecting portion 52 may be inserted in the first slot 611 so as to fix the current collecting member 50 by means of the fixing protrusions 613 formed at a portion adjacent to the first slot 611.

Specifically, as shown in FIG. 4, the plurality of current collecting pieces 512 of the electrode connecting portion 51 may be inserted in the current collecting piece insert slots 612a, respectively, the connecting plate 511 may be inserted in the connecting plate insert slot 612b, and the fixing protrusions 613 may press the tops of the current collecting pieces 512 (as seen in FIG. 3) to fix the current collecting member 50.

Accordingly, as shown in FIG. 3, the current collecting member 50 is fixed to the fixing member 60 and electrically connected to the electrode assembly 10 in order to be installed inside the case 26.

Further, the fixing member 60 according to the present exemplary embodiment may be formed of an insulating material.

Thus, the fixing member 60 may perform the function of blocking an electrical path between the cap plate 20 and the electrode assembly 10, by means of the current collecting member coupling portion 61 disposed between the cap plate 20 and the electrode assembly 10.

Further, the separating portion 62 of the fixing member 60 is disposed between a side of the electrode assembly 10 at which the first uncoated region 11a, is disposed, and a side of the case 26, to perform the function of protecting the current collecting member 50 from external impacts that may be transmitted from the side of the case 26 toward the inside of the case 26.

Specifically, the fixing member 60 may perform the function of an insulating member between the electrode assembly 10 and the cap plate 20 and a protecting function between the electrode assembly 10 and the case 26, and both an insulating member and a protective member can be replaced by only the fixing member 60 according to the present exemplary embodiment.

Therefore, according to the present exemplary embodiment, the number of components used in the rechargeable battery 100 can be reduced, the production cost and production time for the rechargeable battery 100 can be reduced, and the current collecting member 50 may be effectively protected from external impacts.

Further, the current collecting member 50 according to the present exemplary embodiment may be fixed by insertion to the fixing member 60, so that it is possible to easily fix the current collecting member 50 in the case 26.

Figure 6:
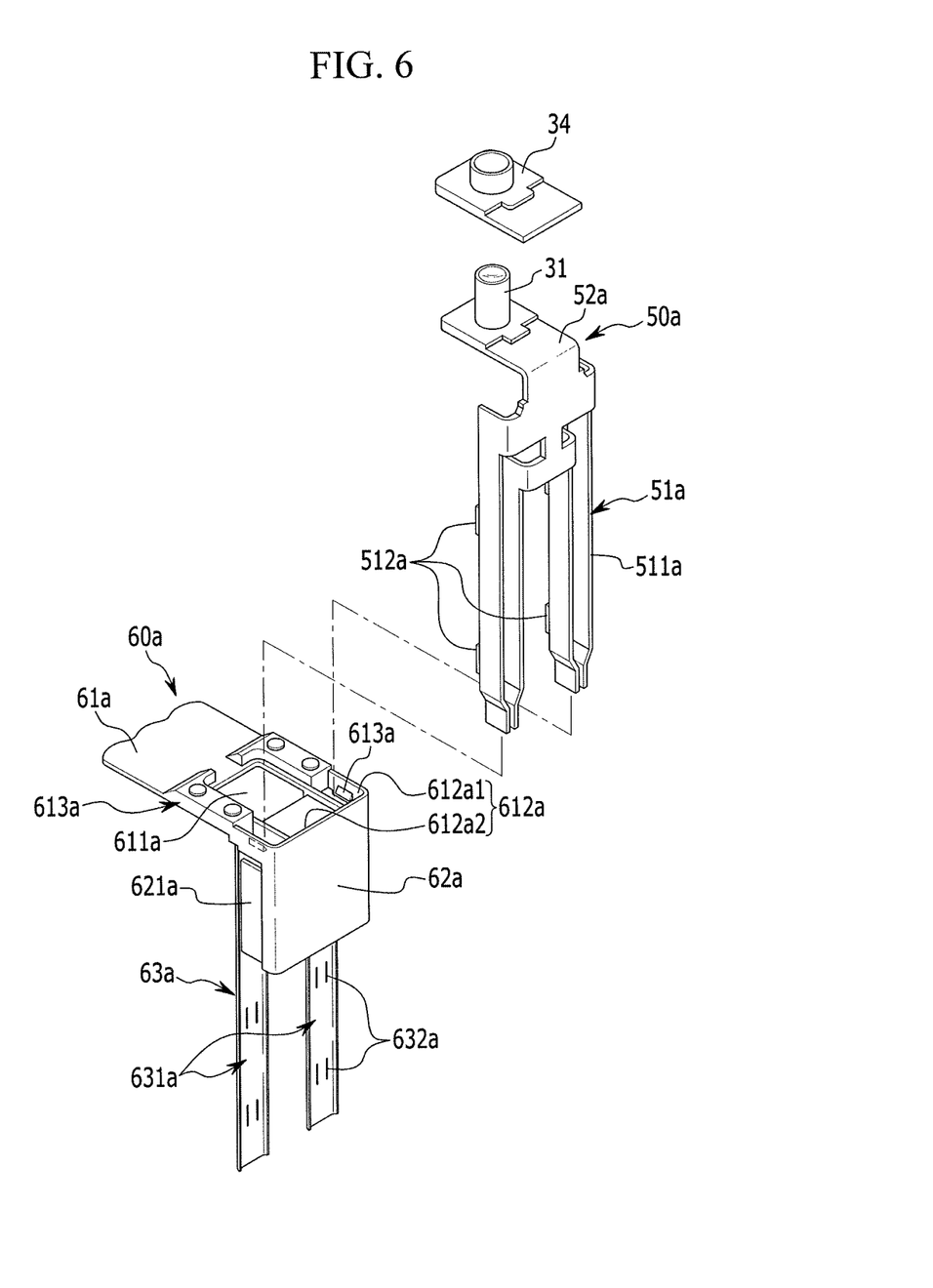
FIG. 6 illustrates an exploded perspective view of a current collecting member and a fixing member of a rechargeable battery according to an exemplary embodiment.
Figure 7:
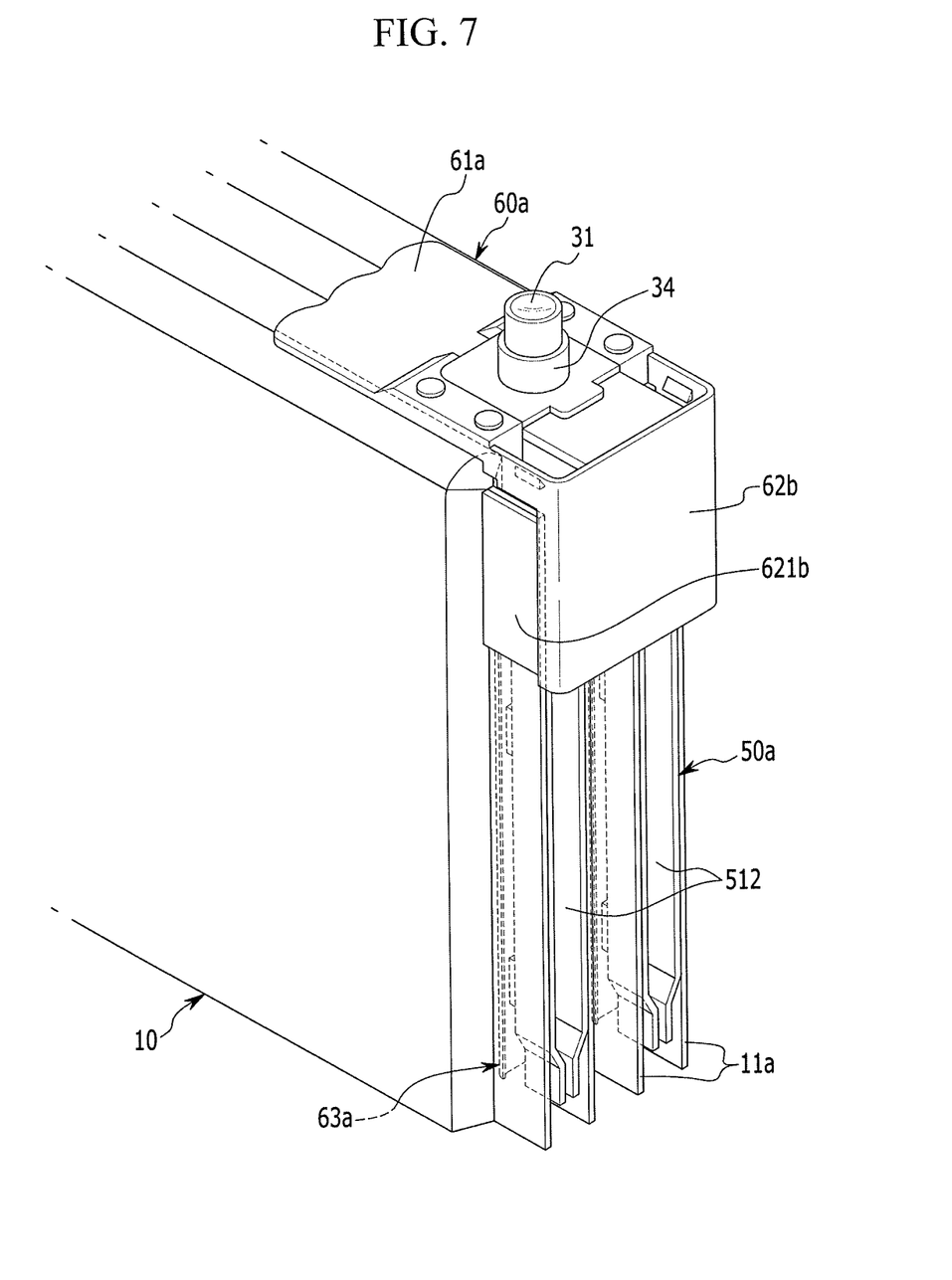
FIG. 7 illustrates a perspective view of a coupled state of the current collecting member and the fixing member of the rechargeable battery in FIG. 6 with the electrode assembly.

FIG. 6 illustrates an exploded perspective view of a current collecting member and a fixing member according to an exemplary embodiment. FIG. 7 illustrates a perspective view of a coupled state of the current collecting member and the fixing member in FIG. 6.

The only differences between the present exemplary embodiment and the previous exemplary embodiment relate to a current collecting member 50a, and a fixing member 60a. Thus, a detailed description of the same structures of the rechargeable battery 100 will not be provided below.

Referring to FIGS. 6 and 7, the current collecting member 50a, according to the present exemplary embodiment may include a terminal connecting portion 52a, to which the first terminal 31 is coupled, and an electrode connecting portion 51a, formed extending from the terminal connecting portion 52a.

The current collecting member 50a, according to the present exemplary embodiment may have the same structure as the current collecting member 50 according to the previous exemplary embodiment, except for current collecting piece protrusions 512a, formed respectively extending from current collecting pieces 511a, of the connecting portion 51a. Thus, a detailed description of the same structures will not be provided below.

Further, the fixing member 60a, according to the present exemplary embodiment may include a current collecting member coupling portion 61a, a separating portion 62a, and a supporting portion 63a.

The current collecting member coupling portion 61a, and the separating portion 62a, including an enclosing portion 621a, according to the present exemplary embodiment may have the same structure as the current collecting member coupling portion 61 and the separating portion 62 according to the previous exemplary embodiment. Thus, a detailed description of the current collecting member coupling portion 61a, and the separating portion 62a, will not be provided below.

Referring to FIG. 6, the supporting portion 63a, according to the present exemplary embodiment may be formed bent and extending from an end of one side of the current collecting member coupling portion 61a.

Accordingly, the supporting portion 63a, according to the present exemplary embodiment may be formed approximately in parallel to the separating portion 62a, with a first slot 611a, and a second slot 612a, formed in the current collecting member coupling portion 61a, therebetween.

In more detail, the supporting portion 63a, according to the present exemplary embodiment may be formed as a pair of supporting plates 631a, having a predetermined thickness and an elongated plate shape and being separated a predetermined distance from one another.

Hereinafter, the coupled relationship of the current collecting member 50a, and the fixing member 60a, according to the present exemplary embodiment will be described.

The coupled relationship of the electrode connecting portion 51a, and the terminal connecting portion 52a, of the current collecting member 50a, and the current collecting member coupling portion 61a, of the fixing member 60a, according to the present exemplary embodiment may be the same as the coupled relationship of the electrode connecting portion 51 and the terminal connecting portion 52 of the current collecting member 50, and the current collecting member coupling portion 61 of the fixing member 60 of the rechargeable battery 100 according to the previous exemplary embodiment. Therefore, a detailed description of the electrode connecting portion 51a and the terminal connecting portion 52a, of the current collecting member 50a, and the current collecting member coupling portion 61a, of the fixing member 60a, will not be provided below.

As shown in FIGS. 6 and 7, the current collecting member 50a, according to the present exemplary embodiment may be inserted in the first slot 611a, of the fixing member 60a, and the second slot 612a, including a current collecting piece insert slot 612a1 and a connecting plate insert slot 612a2, and may be fixed by means of the fixing protrusion 613a.

The current collecting piece protrusions 512a, respectively protruding from the current collecting pieces 511a, of the insulating member 50a, may be coupled and fixed to slots 632a, in the supporting plate 631a, of the supporting portion 63a, of the fixing member 60a. In other words, the current collecting pieces 511a, and the supporting plates 631a, may have complementary mating features.

Further, the supporting portion 63a, of the fixing member 60a, may be disposed between mutually adjacent electrode assemblies 10, and installed in contact with a portion adjacent to a portion of the electrode assembly 10 on which the first uncoated region 11a, is formed.

As shown in FIG. 7, when a pair of current collecting pieces 512 is coupled to the first uncoated regions 11a, adjacent to each other by welding, the supporting region 63a, of the fixing member 60a, is installed in contact with other regions of the electrode assembly 10 which are close to regions at which the first uncoated regions 11a, are formed, so as to perform the function of fixing the electrode assembly 10.

Resultantly, the current collecting member 50a, is easily coupled through insertion to the fixing member 60a, according to the present exemplary embodiment and may be fixed inside the case 26, and also, a plurality of electrode assemblies 10 may be supported by the supporting portion 63a, and securely fixed inside the case 26.

Figure 8:
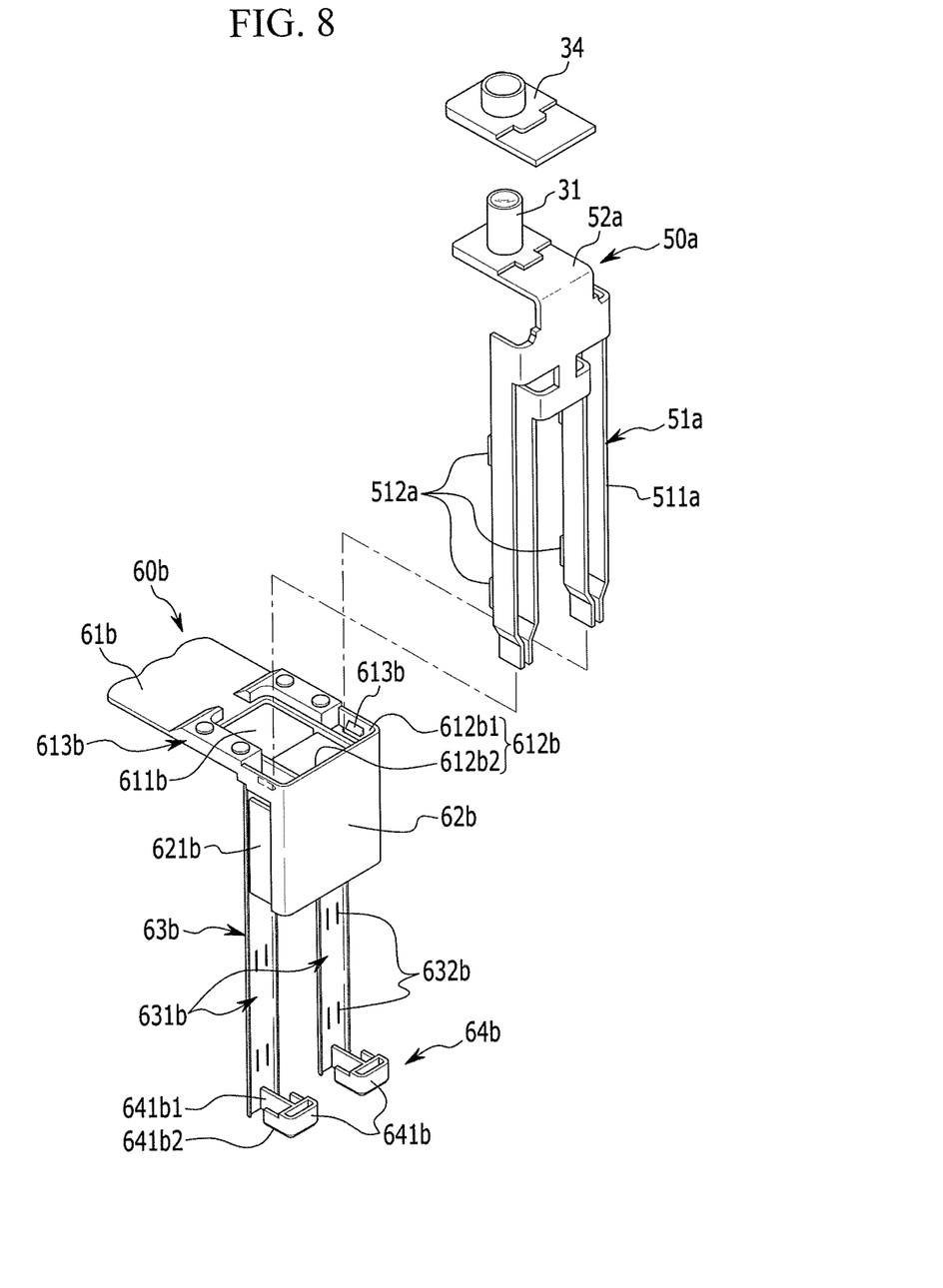
FIG. 8 illustrates an exploded perspective view of a current collecting member and a fixing member of a rechargeable battery according to an exemplary embodiment.
Figure 9:
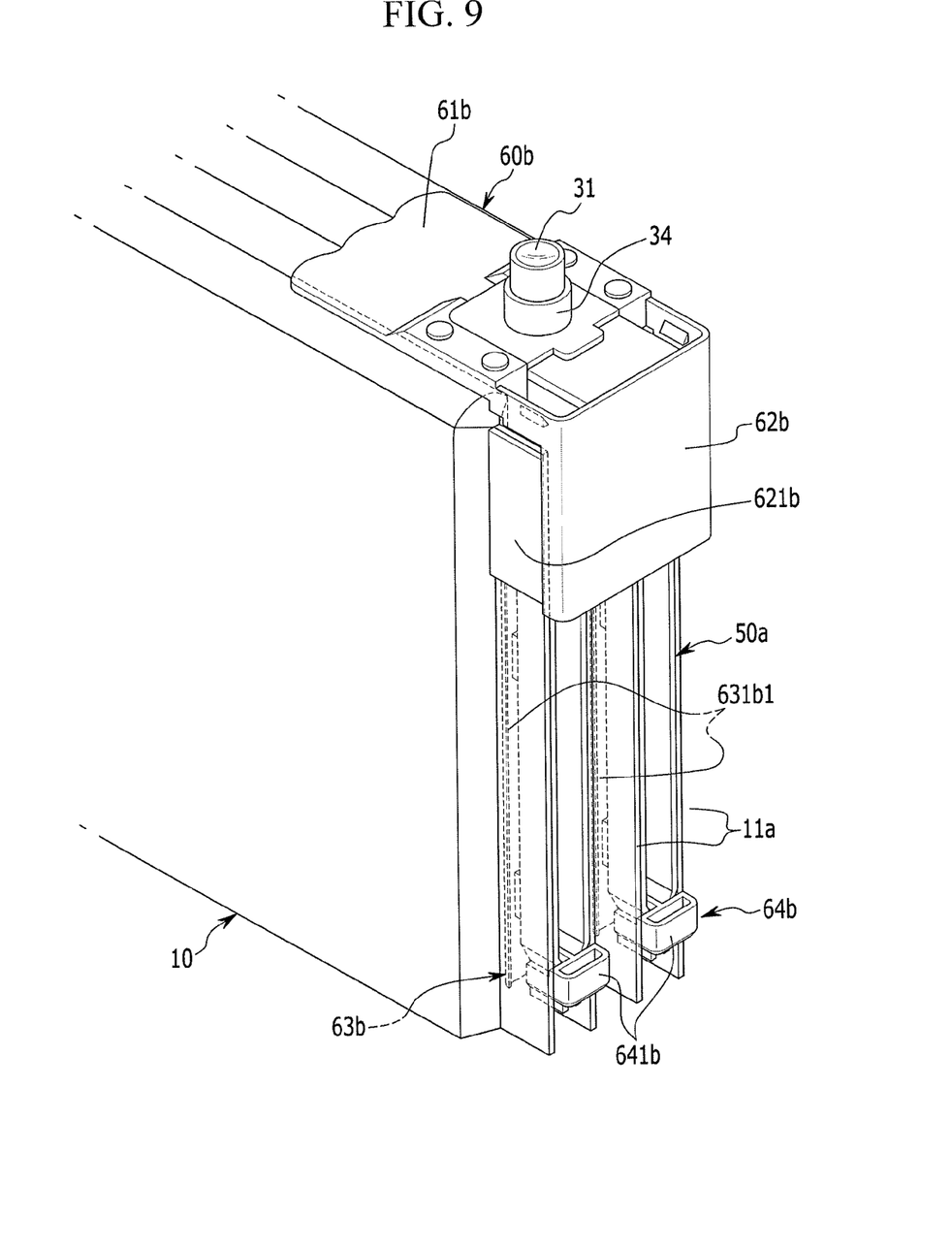
FIG. 9 illustrates a perspective view of a coupled state of the current collecting member and the fixing member of the rechargeable battery in FIG. 8.
Figure 10:
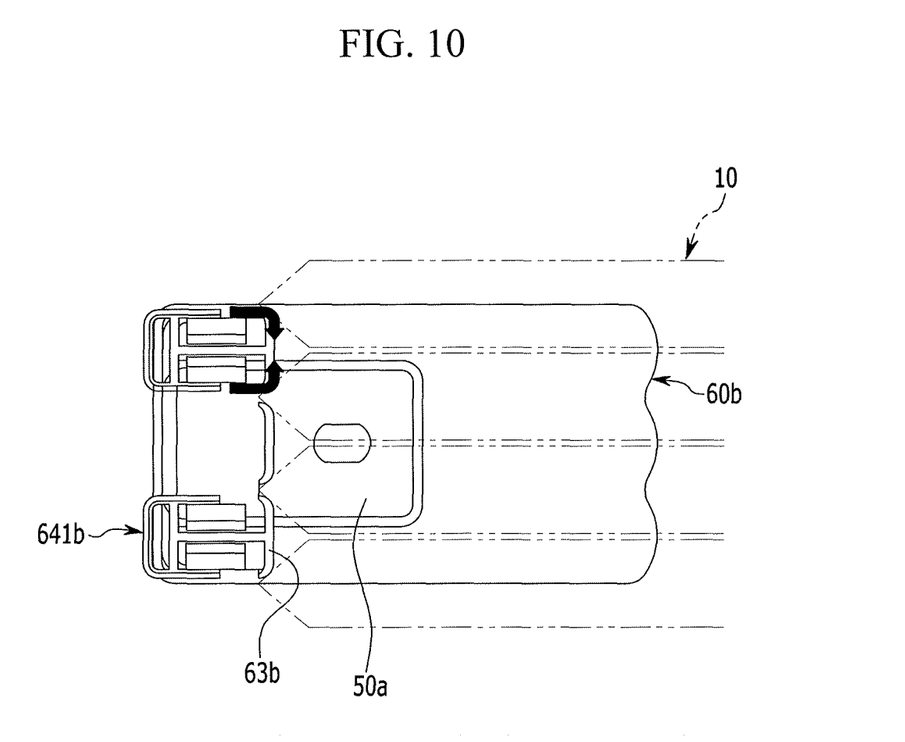
FIG. 10 illustrates a top plan view of a coupled state of the current collecting member and the fixing member of the rechargeable battery in FIG. 9.

FIG. 8 illustrates an exploded perspective view of a current collecting member and a fixing member according to an exemplary embodiment. FIG. 9 illustrates a perspective view of a coupled state of the current collecting member and the fixing member in FIG. 8. FIG. 10 illustrates a top plan view of a coupled state of the current collecting member and the fixing member of the rechargeable battery in FIG. 9.

The only differences between the present exemplary embodiment and the previous exemplary embodiment relate to a fixing member 60b. Thus, a detailed description of structures which are the same as the rechargeable battery 100 according to the previous exemplary embodiments will not be provided below.

To provide a description with reference to FIGS. 8 and 9, the fixing member 60b according to the present exemplary embodiment may include a current collecting member coupling portion 61b, a separating portion 62b, a supporting portion 63b, and a fixing rib portion 64b.

The current collecting member coupling portion 61b, the separating portion 62b, including an enclosing portion 621b, and the supporting portion 63b, according to the present exemplary embodiment may have the same structures as the current collecting member coupling portion 61a, the separating portion 62a, and the supporting portion 62a, of the rechargeable battery 200 according to the previous exemplary embodiment. Accordingly, detailed descriptions of the current collecting member coupling portion 61b, the separating portion 62b, and the supporting region 63b, including slots 632b, for receiving the current collecting piece protrusions 512a, will not be provided below.

Referring to FIG. 8, the fixing rib portion 64b, according to the present exemplary embodiment may be formed extending from an end of one side of the supporting portion 63b. In more detail, the fixing rib portion 64b, according to the present exemplary embodiment may include a pair of fixing ribs 641b, formed respectively extending from a pair of supporting plates 631b.

Here, the fixing ribs 641b, according to the present exemplary embodiment may include a supporting protrusion 641b1 and a supporting slot 641b2. That is, the supporting protrusion 641b1 may be formed extending from the supporting plate 631b of the supporting portion 63b, and the supporting slot 641b2 may be coupled to the end of the supporting protrusion 641b1 to form the fixing rib 641b.

Hereinafter, the coupled relationship of the current collecting member 50 and the fixing member 60b, according to the present exemplary embodiment will be described with reference to FIGS. 8 to 10.

The coupled relationship of the electrode connecting portion 51a, and the terminal connecting portion 52a, of the current collecting member 50a, and the current collecting member coupling portion 61b, of the fixing member 60b, according to the present exemplary embodiment may be the same as the coupled relationship of the electrode connecting portion 51a, and the terminal connecting portion 52a, of the current collecting member 50a, and the current collecting member coupling portion 61a, of the fixing member 60a, according to the previous exemplary embodiment. Further, the coupled relationship of the supporting portion 63b, of the fixing member 60b, and the electrode assembly 10 according to the present exemplary embodiment is the same as the coupled relationship of the supporting portion 63a, of the fixing member 60a, and the electrode assembly 10 according to the previous exemplary embodiment. Accordingly, a detailed description of the coupled relationship of the electrode connecting portion 51a, and terminal connecting portion 52a, of the current collecting member 50a, and the current collecting member coupling portion 61b, of the fixing member 60b, and of the coupled relationship of the supporting portion 63b, of the fixing member 60b, and the electrode assembly 10 will not be provided below. Alternatively, the current collecting member 50 of the previous embodiment, i.e., without the current collecting piece protrusions 512a, and supporting portion 63b, without the slots 632b, may be used with the fixing rib portion 64b.

As shown in FIGS. 8 and 9, the current collecting member 50a, according to the present exemplary embodiment may be inserted and fixed in a first slot 611b, of the fixing member 60b, and in a second slot 612b, that includes a current collecting piece insert slot 612b1 and a connecting plate insert slot 612b2.

Further, the supporting portion 63b, of the fixing member 60b, may be disposed between mutually adjacent electrode assemblies 10, and may be installed in contact with a portion adjacent to a portion of the electrode assemblies 10 at which the first uncoated region 11a, is formed, so as to perform the function of fixing the electrode assemblies 10 inside the case 26.

In addition, according to the present exemplary embodiment, an end at one side of the current collecting piece 51a, of the current collecting member 50a, may be inserted and fixed in the fixing slot 641b2 of the fixing rib 641b.

Accordingly, the current collecting piece 51a, of the current collecting member 50a, is fixed to the pair of fixing ribs 641b, according to the present exemplary embodiment, so that the current collecting member 50 may be more securely fixed inside the case 26.

As support is provided by the current collecting pieces 51a, of the current collecting member 50a, in the fixing slots 641b2 of each fixing rib 641b, according to the present exemplary embodiment, when an external impact (refer to the arrow in FIG. 10) is incurred on the case 26, each of the fixing ribs 641b, may deform (refer to the deformation direction in FIG. 10) to absorb the impact, to thereby prevent damage to the current collecting member 50a.

Here, when an external impact (refer to the arrow in FIG. 10) is incident on the case 26, the supporting plates 631b, of the supporting portion 63b, are disposed in contact with the electrode assembly 10, to thereby prevent the electrode assembly 10 from moving inside the case 26.

According to the present exemplary embodiment, the current collecting member 50 may be easily coupled through insertion with the fixing member 60b, and fixed inside the case 26, and also, a plurality of electrode assemblies 10 may be supported by the supporting portion 63b, and securely fixed inside the case 26, so that the current collecting member 50a, may be protected by the fixing rib portion 64b, to prevent damage from external impacts.

By way of summation and review, embodiments provide a rechargeable battery having at least one of the advantages of reducing production cost, reducing the overall production time of a battery module, and effectively protecting an electrode assembly from external impacts by using a fixing member that can be easily installed in a case and can effectively fix an electrode assembly.

In contrast, conventionally, in order to fix a plurality of rechargeable batteries, there is the problem of individually manufacturing a plurality of fixing structures which need to be assembled thereafter in the process of manufacturing a battery module. Thus, the manufacturing cost for individually manufacturing a plurality of fixing structures increases and gives rise to the problem of an increase in the production cost of the battery module. Further, because a plurality of fixing structures is individually assembled when a battery module is produced, the overall production time of the battery module may be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 100, 200, 300: Rechargeable battery | 10: Electrode assembly |
| 11: Positive electrode | 11a: Positive electrode uncoated region |
| 12: Negative electrode | 12a: Negative electrode uncoated region |
| 13: Separator | 20: Cap plate |
| 30: First terminal portion | 31: First terminal |
| 40: Second terminal portion | 41: Second terminal |
| 50: First current collecting member | |
| 51, 51a: Electrode connecting portion | |
| 511: Connecting plate | 512: Current collecting piece |
| 52, 52a: Terminal connecting portion | 60, 60a, 60b: First fixing member |
| 61, 61a, 61b: Current collecting member coupling portion | |
| 611, 611a: First slot | |
| 612, 612a: Second slot | 613: Fixing protrusion |
| 62, 62a, 62b: Separating portion | 63a, 63b: Supporting portion |
| 64b: Fixing rib portion | 641b: Fixing rib |
| 641b1: Supporting protrusion | 641b2: Supporting slot |
| 70: Second current collecting member | 80: Second fixing member |

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery, comprising:
    an electrode assembly including a first electrode and a second electrode;
    an electrode terminal;
    a current collecting member electrically connecting the electrode terminal and a first electrode uncoated region of the first electrode, the current collecting member including:
        a terminal connecting portion coupled to the electrode terminal, and
        an electrode connecting portion extending from the terminal connecting portion, the electrode connecting portion including:
            an extending connecting plate, and
            a current collecting piece extending from the extending connecting plate along the first electrode uncoated region, the current collecting piece being in contact with the first electrode uncoated region along sidewalls of the first electrode uncoated region;
    a fixing member including a current collecting member coupling portion engaged with the current collecting member, the current collecting piece and the extending connecting plate extending through the fixing member; and
    a case, the electrode assembly, the current collecting member, and the fixing member being disposed within the case, the fixing member being between the current collecting member and the case.

2. The battery as claimed in claim 1, wherein the fixing member includes a separating portion extending from the current collecting member coupling portion along the current collecting member and between the current collecting member and an inner wall of the case.

3. The battery as claimed in claim 2, wherein the separating portion only partially extends along the current collecting member.

4. The battery as claimed in claim 2, wherein the separating portion covers both the electrode uncoated region and the current collecting piece.

5. The battery as claimed in claim 1, wherein the current collecting member coupling portion includes an insert slot through which the electrode connecting portion extends.

6. The battery as claimed in claim 1, wherein the fixing member includes a recess receiving the terminal connecting portion.

7. The battery as claimed in claim 6, wherein the fixing member includes fixing protrusions adjacent the recess, the fixing protrusions extending beyond the terminal connecting portion.

8. The battery as claimed in claim 1, wherein the fixing member is made of an insulating material.

9. The battery as claimed in claim 1, wherein the current collecting member coupling portion extends along the electrode assembly to be between the electrode assembly and an adjacent component.

10. The battery as claimed in claim 1, wherein:
    the first electrode uncoated region includes a plurality of first electrode uncoated regions;
    the connecting plate extending from and at an angle to the terminal connecting portion; and
    the current collecting piece includes a plurality of current collecting pieces extending from the connecting plate, the plurality of current collecting pieces being spaced from one another and in contact with respective first electrode uncoated regions.

11. The battery as claimed in claim 10, wherein the connecting plate is bent at approximately a right angle to the terminal connecting portion so that the connecting plate is between the first electrode uncoated regions and a side wall of the case.

12. The battery as claimed in claim 10, wherein the plurality of current collecting pieces are welded to respective first electrode uncoated regions.

13. A battery, comprising:
    an electrode assembly including a first electrode and a second electrode;
    an electrode terminal;
    a current collecting member electrically connecting the electrode terminal and a first electrode uncoated region of the first electrode, the current collecting member including:

a terminal connecting portion coupled to the electrode terminal, and an electrode connecting portion extending from the terminal connecting portion, the electrode connecting portion including:

an extending connecting plate, and a current collecting piece extending from the extending connecting plate along the first electrode uncoated region, the current collecting piece being in contact with the first electrode uncoated region along sidewalls of the first electrode uncoated region;

a fixing member including a current collecting member coupling portion engaged with the current collecting member, the electrode connecting portion extending through the fixing member;

a case, the electrode assembly, the current collecting member, and the fixing member being disposed within the case, the fixing member being between the current collecting member and the case; and a cap plate coupled on an opening of the case, the electrode terminal extending through the cap plate, wherein the fixing member includes a supporting portion extending from the current collecting member coupling portion along the current collecting and between the current collecting member and first electrode coating region of the electrode assembly, the supporting portion overlapping a portion of the current collecting piece adjacent the extending connecting plate.

14. The battery as claimed in claim 13, wherein the supporting portion includes a first mating feature and the current collecting member includes a second mating feature, the second mating feature corresponding to and complementary to the first mating feature.

15. The battery as claimed in claim 13, wherein the fixing member includes a fixing rib portion that extends from the supporting portion towards an inner wall of the case beyond the current collecting member and the first uncoated electrode region.

16. The battery as claimed in claim 15, wherein the fixing rib portion includes a fixing rib between the inner wall of the case and the current collecting member.

17. The battery as claimed in claim 16, wherein the electrode assembly includes a plurality of electrode assemblies and the current collecting member wherein the collecting piece includes a pair of current collecting pieces that are spaced apart, the fixing rib portion extending between the pair of current collecting pieces.

18. The battery as claimed in claim 17, wherein the fixing rib portion includes fixing slots extending from the fixing rib along an outer surface of each current collecting piece of the pair of current collecting pieces.

19. The battery as claimed in claim 17, wherein the fixing rib extends laterally to be between both current collecting pieces and the inner wall of the case.

20. The battery as claimed in claim 13, wherein the fixing member includes a separating portion extending from the current collecting member coupling portion along the current collecting member and between the current collecting member and an inner wall of the case.

* * * * *